US012624955B2

(12) United States Patent
Ohsugi et al.

(10) Patent No.: US 12,624,955 B2
(45) Date of Patent: May 12, 2026

(54) TRAVEL ROUTE MANAGEMENT SYSTEM

(71) Applicant: TOYOTA JIDOSHA KABUSHIKI KAISHA, Toyota (JP)

(72) Inventors: Masamichi Ohsugi, Sunto-gun (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 18/761,904

(22) Filed: Jul. 2, 2024

(65) Prior Publication Data

US 2025/0020477 A1 Jan. 16, 2025

(30) Foreign Application Priority Data

Jul. 10, 2023 (JP) ................................. 2023-113086

(51) Int. Cl.
*G01C 21/34* (2006.01)
*B60W 60/00* (2020.01)

(52) U.S. Cl.
CPC ....... *G01C 21/3453* (2013.01); *B60W 60/001* (2020.02); *B60W 2556/10* (2020.02)

(58) Field of Classification Search
CPC ............... B60W 20/12; B60W 60/001; B60W 2050/0005; B60W 2552/20; B60W 2552/15; B60W 2552/25; B60W 2552/05; B60W 2556/10; B60W 2556/00; B60W 2556/40; G01C 21/3453; G01C 21/34; G01C 21/26; G01C 21/3617; G01C 21/3484
See application file for complete search history.

(56) References Cited

U.S. PATENT DOCUMENTS

| | | | |
|---|---|---|---|
| 2010/0088282 A1* | 4/2010 | Yamada | G06F 16/128 |
| | | | 707/649 |
| 2020/0012280 A1* | 1/2020 | Lin | B60W 60/001 |
| 2020/0169781 A1* | 5/2020 | Nishimura | G06F 16/40 |

(Continued)

FOREIGN PATENT DOCUMENTS

| | | | |
|---|---|---|---|
| JP | 2012081829 A | * | 4/2012 |
| JP | 2017-134725 A | | 8/2017 |

(Continued)

*Primary Examiner* — Ramon A. Mercado
*Assistant Examiner* — Noah W Stiebritz
(74) *Attorney, Agent, or Firm* — Dinsmore & Shohl LLP

(57) ABSTRACT

The present disclosure provides a travel route management system that generates a travel route for autonomous driving control of a vehicle. The travel route management system comprises one or more storage devices configured to store a travel record that includes data of past travel of the vehicle by the autonomous driving control, and processing circuitry. The vehicle comprises a target storage device that stores log data related to the autonomous driving control. The processing circuitry is configured to execute acquiring a remaining capacity of the target storage device, generating one or more candidate routes, and selecting the travel route from the one or more candidate routes. Selecting the travel route includes using a number of common points with the travel record as an index for selecting the travel route from the one or more candidate routes when the remaining capacity is smaller than a predetermined amount.

5 Claims, 5 Drawing Sheets

(56) References Cited

U.S. PATENT DOCUMENTS

2020/0191586 A1 * 6/2020 Luo .................... G01C 21/3492
2022/0382292 A1 * 12/2022 Suzuki .................. G01C 21/34

FOREIGN PATENT DOCUMENTS

| JP | 2020-008441 A | 1/2020 | |
| JP | 2020-060901 A | 4/2020 | |
| JP | 2021-514883 A | 6/2021 | |
| WO | WO-2024246978 A1 * | 12/2024 | ........... G07C 5/0866 |

* cited by examiner

TRAVEL ROUTE MANAGEMENT SYSTEM

CROSS-REFERENCE TO RELATED APPLICATION

The present application claims priority under 35 U.S.C. § 119 to Japanese Patent Application No. 2023-113086, filed on Jul. 10, 2023, the contents of which application are incorporated herein by reference in their entirety.

BACKGROUND

Field

The present disclosure relates to a travel route management system which generates a travel route for autonomous driving control.

Background Art

JP2020-060901A discloses a driving information management device which can record a route traveled by autonomous driving in the past as a history route. The driving information management device is mounted on a vehicle including an autonomous driving device capable of switching manual driving and autonomous driving. According to the driving information management device, when the autonomous driving device is switched to autonomous driving, generation of autonomous driving history data indicating a history of a traveling route on which autonomous driving has been performed is automatically started. The autonomous driving history data is stored in a database, and when the vehicle travels, a route on which autonomous driving is possible can be read from the past history.

In addition to the above-described JP2020-060901A, the following JP2017-134725A and JP2020-008441A can be exemplified as documents showing the technical level of the technical field related to the present disclosure.

SUMMARY

A technique for autonomously driving a vehicle is known. When the vehicle travels by autonomous driving, it is desirable that data related to autonomous driving control be stored so that how the autonomous driving of the vehicle is performed can be verified later. However, it may become difficult to store all data depending on how large a capacity of data is remained. In such a case, how to ensure transparency and ease of verification of the autonomous driving control is a problem.

An object of the present disclosure is to provide a technique that makes it possible to ensure transparency and ease of verification of autonomous driving control of a vehicle when log data related to the autonomous driving control is stored.

The present disclosure provides a travel route management system that generates a travel route for autonomous driving control of a vehicle. The travel route management system comprises one or more storage devices configured to store a travel record that includes data of past travel of the vehicle by the autonomous driving control, and processing circuitry. The vehicle comprises a target storage device that stores log data related to the autonomous driving control. The processing circuitry is configured to execute acquiring a remaining capacity of the target storage device, generating one or more candidate routes, and selecting the travel route from the one or more candidate routes. Selecting the travel route includes using a number of common points with the travel record as an index for selecting the travel route from the one or more candidate routes when the remaining capacity is smaller than a predetermined amount.

According to the technique of the present disclosure, the travel route management system includes one or more storage devices that stores the travel record that includes data of past travel of the vehicle by the autonomous driving control. The travel route management system first generates one or more candidate route, which become one or more candidates for the travel route. When the remaining capacity of one or more storage devices for storing the log data related to the autonomous driving control is equal to or less than the predetermined amount, the travel route management system selects the travel route from one or more candidate routes using the number of common points with the travel record as the index. When the vehicle travels along the travel route generated in this way, the data related to the autonomous driving control can be complemented by the log data stored in the past even if the data is not stored.

In this way, according to the present disclosure, it is possible to ensure transparency and ease of verification of the autonomous driving control.

DETAILED DESCRIPTION

1. Autonomous Driving of Vehicle

Figure 1:
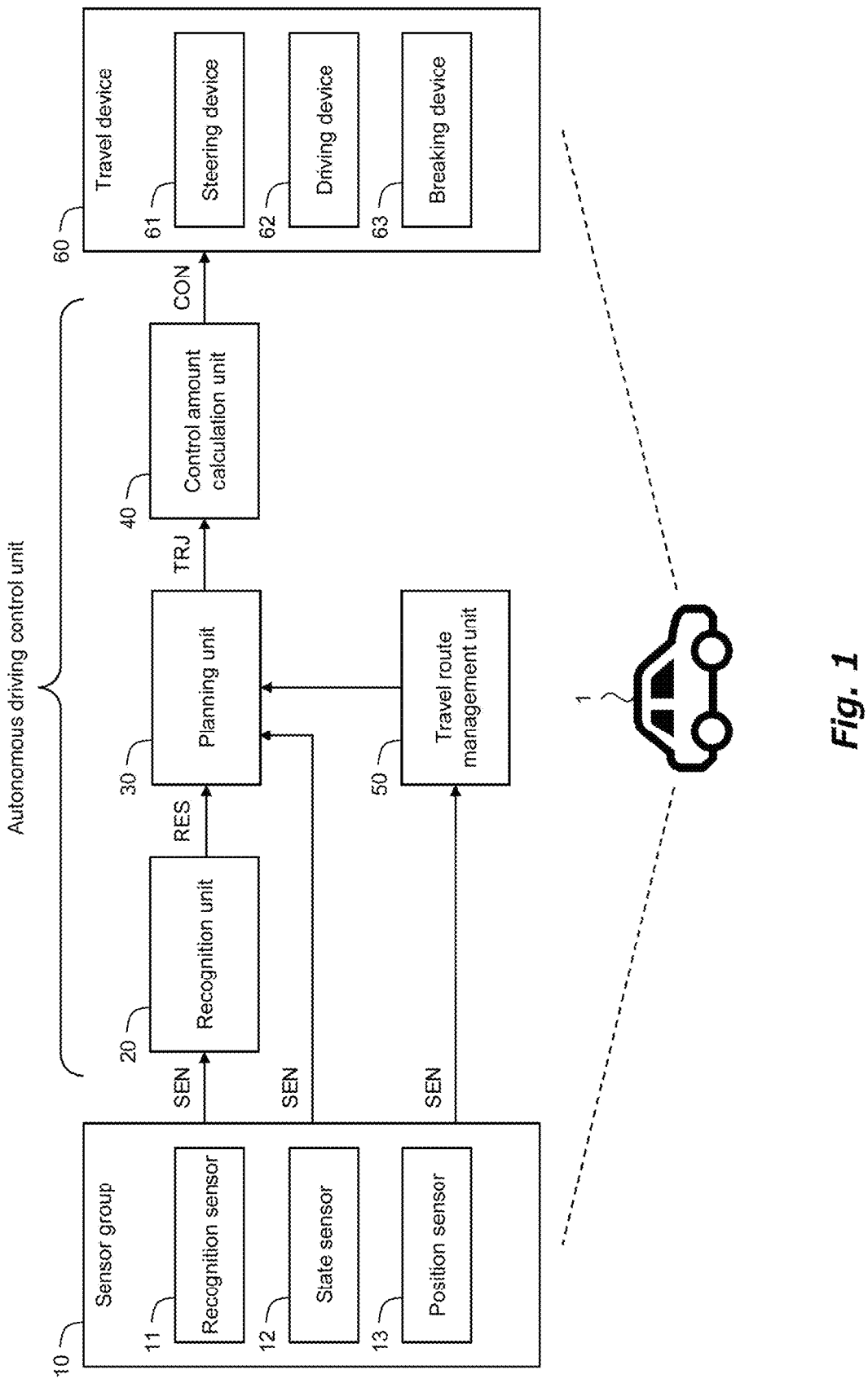
FIG. 1 is a diagram showing an example of a configuration related to autonomous driving control of a vehicle according to a present embodiment.

FIG. 1 is a block diagram showing a configuration example related to autonomous driving control of a vehicle 1 according to a present embodiment. The autonomous driving is automatically performing at least one of steering, acceleration, and deceleration of the vehicle 1 without depending on a driving operation by an operator. The autonomous driving control is a concept including not only complete autonomous driving control but also risk avoidance control, lane keep assist control, and the like. The operator may be a driver on board the vehicle 1 or a remote operator who remotely operates the vehicle 1.

The vehicle 1 includes a sensor group 10, a recognition unit 20, a planning unit 30, a control amount calculation unit 40, a travel route management unit 50, and a travel device 60.

The sensor group 10 includes a recognition sensor 11, a state sensor 12, and a position sensor 13. The recognition sensor 11 is used for recognizing a situation around the vehicle 1. Examples of the recognition sensor 11 include a camera, a laser imaging detection and ranging (LIDAR), and a radar. The state sensor 12 detects a state of the vehicle 1. Examples of the state sensor 12 include a speed sensor, an acceleration sensor, a yaw rate sensor, and a steering angle sensor. The position sensor 13 detects a position of the vehicle 1. As the position sensor 13, a global navigation satellite system (GNSS) sensor is exemplified.

Sensor detection information SEN is information acquired by the sensor group 10. The sensor detection information SEN includes recognition sensor information, vehicle state information, and position information. The recognition sensor information is information acquired by the recognition sensor 11 recognizing the situation around the vehicle 1. For example, the recognition sensor information includes an image captured by the camera or point group information obtained by the LIDAR. The vehicle state information is information indicating the state of the vehicle 1 obtained by the state sensor 12. The position information is information indicating the position of the vehicle 1 obtained by the position sensor 13.

The recognition unit 20, the planning unit 30, and the control amount calculation unit 40 constitute an "autonomous driving control unit", which controls the autonomous driving of the vehicle 1. The recognition unit 20 receives the sensor detection information SEN including at least the recognition sensor information from the sensor group 10. The recognition unit 20 recognizes the situation around the vehicle 1 based on the received sensor detection information SEN. For example, the recognition unit 20 recognizes an object around the vehicle 1. Examples of the object include a pedestrian, another vehicle (e.g., a preceding vehicle, a parked vehicle, and the like), a white line, a road structure (e.g., a guard rail, a curb, and the like), a fallen object, a traffic light, an intersection, and a sign. Recognition result information RES indicates a recognition result by the recognition unit 20. For example, the recognition result information RES includes object information indicating a relative position and a relative speed of the object with respect to the vehicle 1 and information about a curvature, a road width, and the like of a road in which the vehicle 1 travels.

The travel route management unit 50 generates and manages a travel route indicating a route which the vehicle 1 follows when traveling to a destination. The travel route may include specification of a lane in which the vehicle 1 travels following the route. Generation of the travel route by the travel route management unit 50 will be described later.

The planning unit (planner) 30 receives the recognition result information RES from the recognition unit 20. The planning unit 30 also receives the travel route from the travel route management unit 50. The planning unit 30 may also receive the vehicle state information, the position information, and map information generated in advance. The map information may be high-precision three dimensional map information. The planning unit 30 generates a travel plan for traveling along the travel route based on the received information. Examples of the travel plan include maintaining a currently traveling lane, changing lanes, overtaking, turning right or left, steering, accelerating, decelerating, and stopping. Further, the planning unit 30 generates a target trajectory TRJ required for the vehicle 1 to travel in accordance with the travel plan. The target trajectory TRJ includes a target position and a target speed. The travel plan and the target trajectory TRJ may include those generated to avoid a risk.

The control amount calculation unit 40 receives the target trajectory TRJ from the planning unit 30. The control amount calculation unit 40 calculates a control amount CON required for the vehicle 1 to follow the target trajectory TRJ. It can also be said that the control amount CON is a control amount which is required for reducing a deviation of the vehicle 1 from the target trajectory TRJ. The control amount CON includes at least one of a steering control amount, a drive control amount, and a braking control amount. Examples of the steering control amount include a target steering angle, a target torque, a target motor angle, and a target motor drive current. Examples of the drive control amount include a target speed and a target acceleration. Examples of the braking control amount include a target speed and a target deceleration.

The travel device 60 includes a steering device 61, a driving device 62, and a braking device 63. The steering device 61 steers wheels of the vehicle 1. For example, the steering device 61 includes an electric power steering (EPS) device. The driving device 62 is a power source that generates a driving force. Examples of the driving device 62 include an engine, an electric motor, and an in-wheel motor. The braking device 63 generates a braking force. The travel device 60 receives the control amount CON from the control amount calculation unit 40. The travel device 60 operates the steering device 61, the driving device 62, and the braking device 63 in accordance with the steering control amount, the driving control amount, and the braking control amount, respectively. Thus, the vehicle 1 travels so as to follow the target trajectory TRJ.

Figure 2:
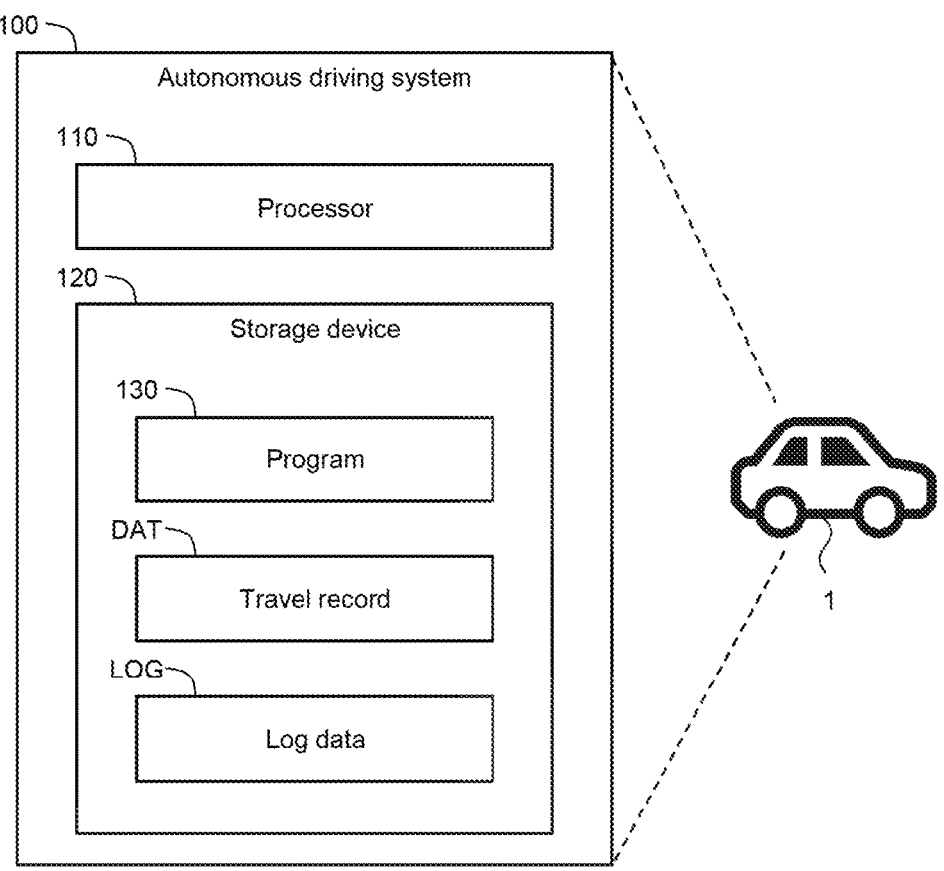
FIG. 2 is a diagram showing an example of a configuration of an autonomous driving system according to the present embodiment.

FIG. 2 is a conceptual diagram showing a configuration example of an autonomous driving system 100 according to the present embodiment. The autonomous driving system 100 is mounted on the vehicle 1 and performs the autonomous driving control of the vehicle 1. The autonomous driving system 100 has at least the function of the above-described autonomous driving control unit. The autonomous driving system 100 may further include the sensor group 10 and the travel device 60.

The autonomous driving system 100 includes one or more processors 110 (hereinafter, simply referred to as a processor 110 or processing circuitry) and one or more storage devices 120 (hereinafter, simply referred to as a storage device 120).

The processor 110 executes various processes. Examples of the processor 110 include a central processing unit (CPU), a graphics processing unit (GPU), an application specific integrated circuit (ASIC), and a field-programmable gate array (FPGA).

The storage device 120 stores a program 130 and various kinds of information. Examples of the storage device 120 include a hard disk drive (HDD), a solid state drive (SSD), a volatile memory, and a nonvolatile memory.

The program 130 is a computer program for controlling the vehicle 1 and is executed by the processor 110. The program 130 may be recorded on a computer-readable storage medium. Various processes by the autonomous driving system 100 are implemented by a cooperation of the processor 110 executing the program 130 and the storage device 120. That is, the recognition unit 20, the planning unit 30, the control amount calculation unit 40, and the travel route management unit 50 are implemented by the processor 110 executing the program 130. Each of the functional units may be implemented by a single processor 110 or may be implemented by separate processors 110.

The various kinds of information stored in the storage device 120 includes the map information and a travel record DAT. The travel record DAT is data for managing a path through which the vehicle 1 has traveled by the autonomous driving control. The travel record DAT includes past travel of the vehicle 1 by the autonomous driving control. Examples of the travel record DAT include data related to a past-record route, which is a route along which the vehicle has traveled in the past, data related to a past-record lane, which is a lane in which the vehicle travels in the past, and information about a past-record road shape, which is a road shape existing in a route along which the vehicle has traveled in the past. The travel record DAT may further include information about a past-record time zone in which the vehicle 1 has traveled in the past.

The data related to a past-record route is, for example, data showing the past-record route on a map. The information about a past-record road shape is, for example, information indicating a curvature, a gradient, a road width, and the like of a road of at least a part of the route along which the vehicle 1 has traveled in the past. Alternatively, the information about the road shape may be information indicating whether a specific road shape is included in the route along which the vehicle 1 has traveled in the past or not. Examples of the specific road shape include a curved road having a predetermined curvature, a slope having a predetermined gradient, a branch, a merging point, a road marking, a road under construction, and a road sectioned by a ball, a pylon, or the like instead of a line.

Reference is made to FIG. 1 again. The recognition unit 20 includes at least one of a rule-based model and a machine learning model. The rule-based model performs a recognition process based on a predetermined rule group. Examples of the machine learning model include a neural network (NN), a support vector machine (SVM), a regression model, and a decision tree model. The NN may be a convolutional neural network (CNN), a recurrent neural network (RNN), or a combination of CNN and RNN. The type of each layer, the number of layers, and the number of nodes in the NN are arbitrary. The machine learning model is generated in advance through machine learning. The recognition unit 20 performs the recognition process by inputting the sensor detection information SEN into the model. The recognition result information RES is output from the model or generated based on the output from the model.

Similarly, the planning unit 30 also includes at least one of a rule-based model and a machine learning model. The planning unit 30 performs a planning process by inputting the recognition result information RES into the model. The target trajectory TRJ is output from the model or generated based on the output from the model.

Similarly, the control amount calculation unit 40 includes at least one of a rule-based model and a machine learning model. The control amount calculation unit 40 performs the control amount calculation process by inputting the target trajectory TRJ to the model. The control amount CON is output from the model or generated based on the output from the model. The storage device 120 stores data of models included in the recognition unit 20, the planning unit 30, and the control amount calculation unit 40, and is used for the autonomous driving control.

Two or more of the recognition unit 20, the planning unit 30, and the control amount calculation unit 40 may have an integrated architecture. All of the recognition unit 20, the planning unit 30, and the control amount calculation unit 40 may have an integrated architecture (End-to-End architecture). For example, the recognition unit 20 and the planning unit 30 may be integrally constituted by an NN which outputs the target trajectory TRJ from the sensor detection information SEN. Even in the case of the integrated architecture, intermediate products such as the recognition result information RES or the target trajectory TRJ may be output. For example, in a case where the recognition unit 20 and the planning unit 30 are integrally constituted by an NN, the recognition result information RES may be an output from an intermediate layer of the NN.

In the present embodiment, a machine learning model is used in at least a part of the autonomous driving control unit.

That is, at least one of the recognition unit 20, the planning unit 30, and the control amount calculation unit 40 includes a machine learning model. The autonomous driving control unit performs at least a part of the autonomous driving control of the vehicle 1 using the machine learning model.

During the autonomous driving control, the processor 110 acquires a log of data related to the autonomous driving control. Hereinafter, this data is referred to as control data. The processor 110 stores a log of a part or all of the control data acquired during the autonomous driving control in the storage device 120 as log data LOG. The processor 110 may store the control data in the storage device 120 during a predetermined period of time. The control data is stored in order to ensure capability of explanation of the autonomous driving control.

The autonomous driving system 100 according to the present embodiment is configured as described above. In the autonomous driving system 100, a travel route management system according to the present embodiment is implemented by the processor 110 which implements the travel route management unit 50 and the storage device 120 which stores the travel record DAT. The storage device 120 may include a storage device for storing the travel record DAT and a storage device for storing the log data LOG separately.

2. Processing Relating to Generating Travel Route

Figure 3:
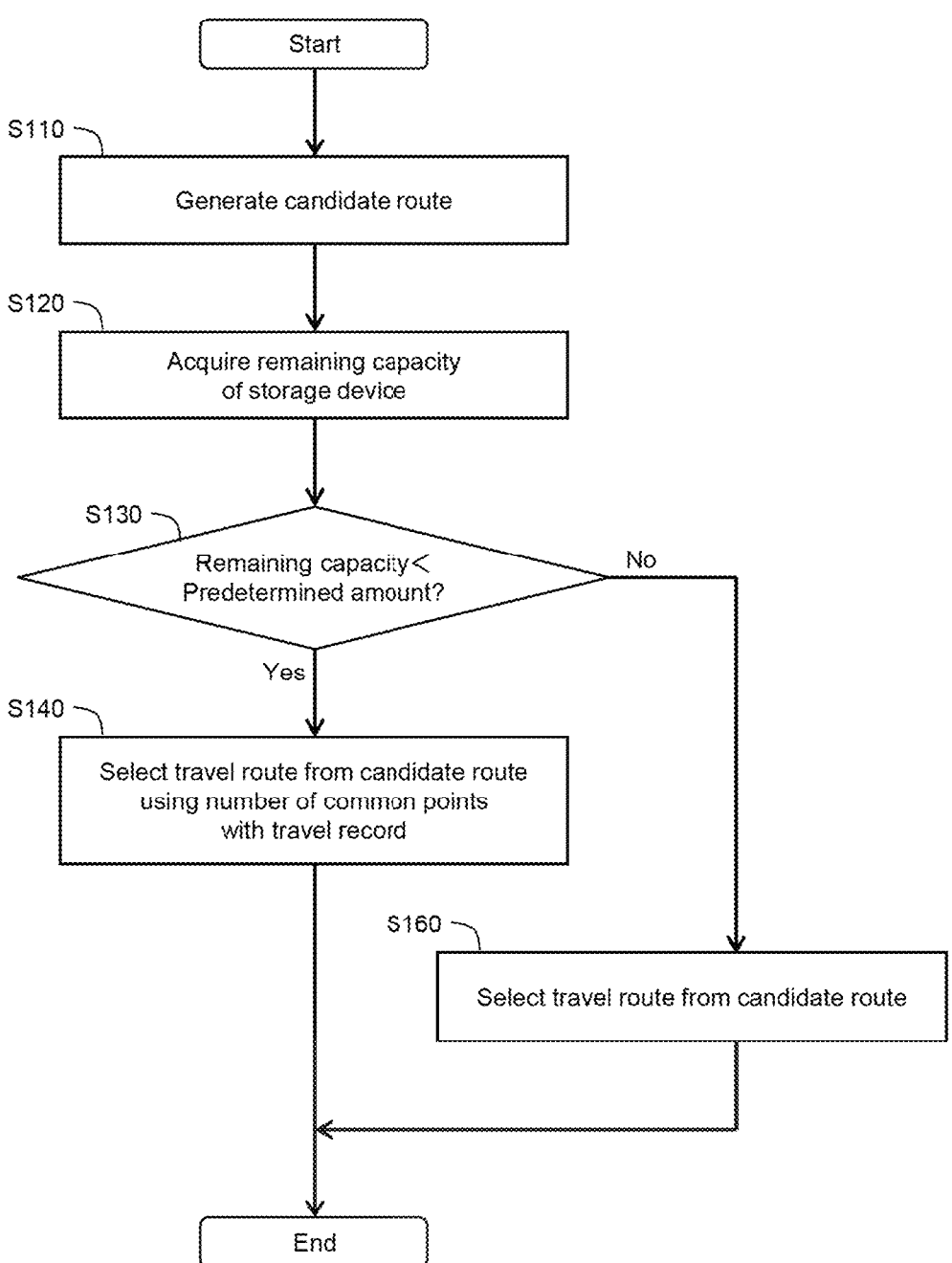
FIG. 3 is a flowchart showing an example of processing related to generation of a travel route.

FIG. 3 is a flowchart showing an example of processing which is related to generation of the travel route and is executed by the travel route management unit 50. The processing according to the flowchart shown in FIG. 3 is executed at timing at which the autonomous driving system 100 determines the travel route of the vehicle 1. The timing at which the travel route of the vehicle 1 is determined is, for example, timing at which the vehicle 1 starts traveling by the autonomous driving. Alternatively, the travel route may be changeable at arbitrary timing after the vehicle 1 starts traveling, and the processing may be executed at timing of changing the travel route.

In Step S110, the processor 110 generates a candidate route. The candidate route is a route which is a candidate for the travel route. The processor 110 acquires a destination input by the operator, the position information of the vehicle 1 included in the sensor detection information SEN, and the map information stored in the storage device 120 and generates a route connecting the current position of the vehicle 1 and the destination as the candidate route, for example. There may be a plurality of candidate routes. Further, the candidate route may include information specifying a lane in which the vehicle 1 travels in addition to the route along which the vehicle 1 travels.

In Step S120, the processor 110 acquires a remaining capacity of the storage device 120. In a case where the storage device 120 includes a plurality of storage devices, the remaining capacity of a storage device for storing the log data LOG is acquired here.

In Step S130, the processor 110 determines whether the remaining capacity acquired in Step S120 is less than a predetermined amount or not. If the remaining capacity is smaller than the predetermined amount (Step S130; Yes), the processing proceeds to Step S140. On the other hand, when the remaining capacity is equal to or larger than the predetermined amount (Step S130; No), the processing proceeds to Step S160.

In Step S140, the processor 110 selects a travel route from one or more candidate routes generated in Step S110. At this time, the processor 110 uses the number of common points with the travel record DAT as an index for selecting the travel route from the one or more candidate routes.

The number of the common points of the candidate route with the travel record DAT is described. The number of the common points is determined, for example, based on how much the candidate route has in common with the past-record route. The processor 110 acquires information about a route in which the vehicle 1 has traveled in the past from the travel record DAT and compares it with the candidate route. Then, the processor 110 determines that the candidate route has more common points as it has more in common with the past-record route of the vehicle 1. Having more in common with the past-record route of the vehicle 1 is, for example, that an overlapping ratio of a route in the candidate route with the past-record route of the vehicle 1 is larger or that a remaining length of the candidate route is shorter when the past-record route of the vehicle 1 is excluded.

In a case where the candidate route includes information specifying a lane in which the vehicle 1 travels, the number of the common points with the travel record DAT may be determined based on how much the candidate route has in common with the past-record lane of the vehicle 1. For example, the processor 110 acquires information about the past-record route and which lane in the past-record route the vehicle 1 has traveled in the past from the travel record DAT. Then, the processor 110 determines that the candidate route has more common points with the travel record DAT as it has more in common with the past-record lane of the vehicle 1. At this time, the processor 110 may determine that the candidate route has more in common with the past-record lane of the vehicle 1 when it includes the same lane in a different route. For example, it is assumed that the travel record DAT includes only data indicating that the vehicle 1 has traveled in a left lane in the past and does not include data indicating that the vehicle 1 has traveled in a right lane. In this case, it may be determined that the candidate route has more common points as it includes more portions in which the left lane is specified as the lane in which the vehicle 1 travels.

In a case where the candidate route does not include a route in common with the past-record route, the number of common points of the candidate route with the travel record DAT may be determined based how much the candidate route has in common with the past-record road shape. In this case, the processor 110 acquires information about one or more road shapes included in each of the candidate routes from, for example, the map information stored in the storage device 120. Then, the processor 110 determines that the candidate route has more common points with the travel record DAT as it has more in common with the past-record road shape. Having more in common with the past-record road shape means that having more in common with the road shape which the vehicle 1 has experienced in the past. Here, that the vehicle 1 has experienced a road shape means that there has been the road shape in a route along which the vehicle 1 has traveled in the past. For example, it is assumed that the vehicle 1 has experienced a merging point in the past and has not experienced a slope having a predetermined gradient. Then, it is assumed that the candidate routes include a candidate route including a merging point and a candidate route including a slope having a predetermined gradient when the processor 110 acquires information about the road shape included in each of the candidate routes. In this case, the processor 110 may determine that the candidate route including the merging point has more common points than the candidate route including the slope.

As an example, a case is considered that there are the following five candidate routes. In the first candidate route, all the route the vehicle 1 travels from the departure place to the destination overlap with the past-record route and the lane is also common with the past-record lane. In the second candidate route, all the route is common with the past-record route but the lane is not common with the past-record lane. The third candidate route includes a route not common with the past-record route but the overlapping ratio of it with the past-record route is large. The fourth candidate route does not include a common route with the past-record route but include a common road shape with the past-record road shape. The fifth candidate route does not include a common route with the past-record route includes many road shapes not common with the past-record road shape. In this case, it is determined the first candidate route has the most common pointes and the number of common points decreases in ascending order.

When the remaining capacity is equal to or larger than the predetermined amount, in Step S160, the processor 110 selects the travel route from one or more candidate routes generated in Step S130. It is the same that the travel route is selected from one or more candidate routes is the same as in Step S140. However, when the travel route is selected in Step S160, the number of common points with the travel record DAT is not used as an index for selecting the travel route.

The method of selecting the travel route in Step S160 is arbitrary. For example, the processor 110 may select the shortest route from one or more candidate routes as the travel route, may select a route with the smallest gradient as the travel route, or may select the travel route from the viewpoint of fuel efficiency.

After the travel route is selected in Step S140 or Step S160, the processing ends. The travel route is generated by processing like this. The generated travel route is acquired by the planning unit 30, and the planning unit 30 generates the travel plan of the vehicle 1 for traveling along the travel route. If the travel route has already been generated when the processing ends, the travel route is changed and the planning unit 30 newly generates the travel plan for traveling along the new travel route.

3. Processing Related to Storing Control Data

Figure 4:
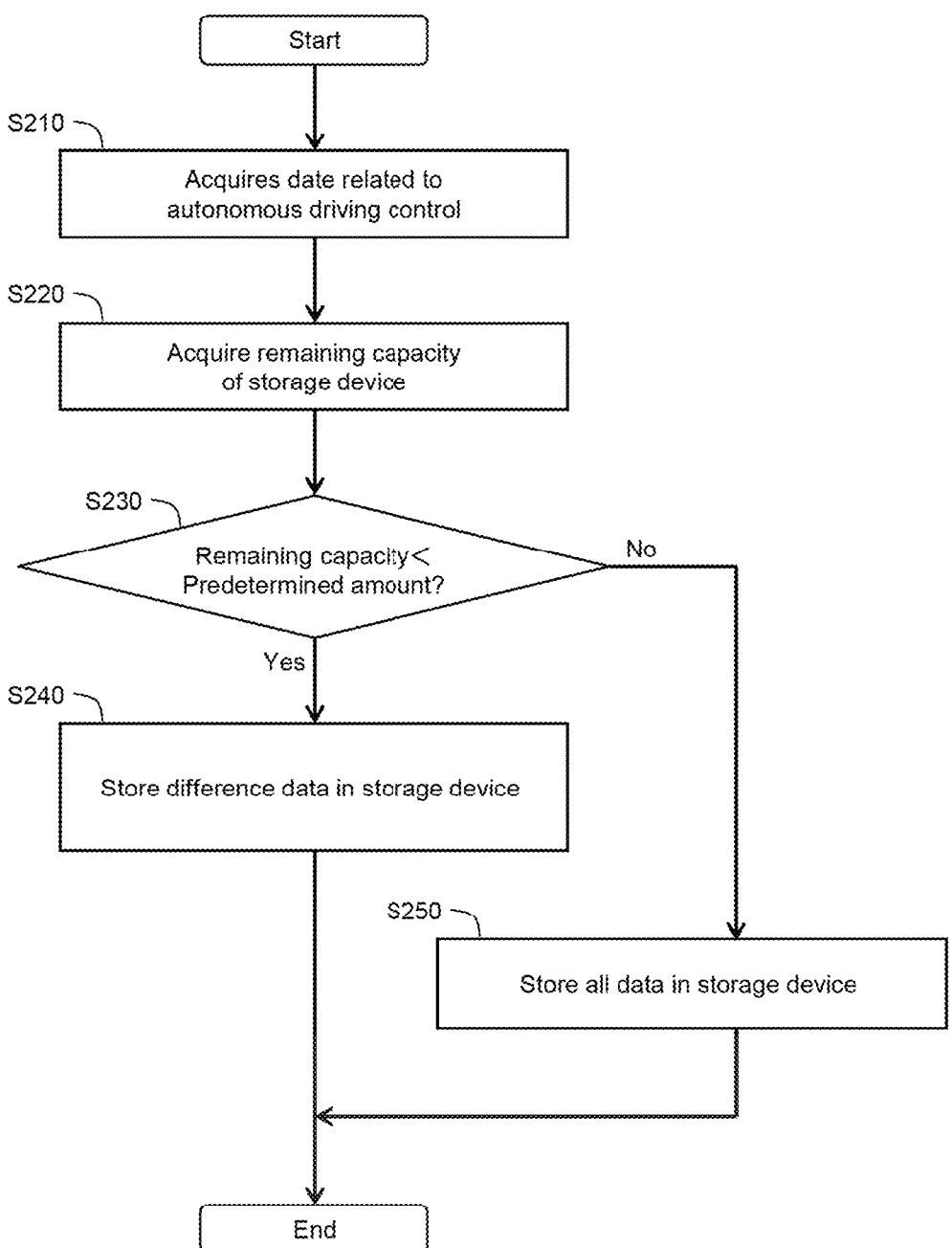
FIG. 4 is a flowchart showing an example of processing related to storage of control data.

As described above, the processor 110 acquires the control data and stores the control data in the storage device 120 as the log data LOG while the autonomous driving control is performed. FIG. 4 is a flowchart showing processing related to the storage of the control data. The processing according to the flowchart shown in FIG. 4 is, for example, repeatedly executed at a predetermined processing cycle while the autonomous driving control is performed.

In step S210, the processor 110 acquires date related to the autonomous driving control. Here, basically, all data used for the autonomous driving control is acquired considering that the data is used for verification or the like later. For example, the sensor detection information SEN input to the recognition unit 20 and the recognition result information RES output from the recognition unit 20 are acquired. Alternatively, for example, when the recognition unit 20, the planning unit 30, and the control amount calculation unit 40 have an integrated architecture, the sensor detection information SEN input to the autonomous driving control unit, the recognition result information RES and the target trajectory TRJ as intermediate products, and the control amount CON output from the autonomous driving control unit are acquired. The acquired data may further include a reason of determination in the recognition process by the recognition unit 20, a reason of determination in the planning process by the planning unit 30, the presence or absence of intervention of the operator into the autonomous driving control, and the like.

In Step S220, the processor 110 acquires the remaining capacity of the storage device 120. The remaining capacity of the storage device 120 acquired here means a capacity of newly storing the control data. In a case where the storage device 120 includes a plurality of storage devices, the remaining capacity of the storage device for storing the log data LOG is acquired.

In Step S230, the processor 110 determines whether the remaining capacity acquired in Step S210 is less than a predetermined amount or not. The predetermined amount used here may be larger than or equal to the predetermined amount used in Step S130 of FIG. 3. If the remaining capacity is smaller than the predetermined amount (Step S230; Yes), the processing proceeds to Step S240.

In Step S240, the processor 110 stores difference data in the storage device 120. The difference data is data which is a difference of the data acquired in Step S210 from the log data LOG. For example, in a case where the vehicle 1 travels along a route along which the vehicle 1 has traveled in the past, it is expected that a surrounding view captured by the camera included in the sensor detection information SEN input to the recognition unit 20 or a detection result about a position of the white line included in the recognition result information RES output from the recognition unit 20 becomes substantially equivalent to data included in the log data LOG stored in the past. Such data excluding data equivalent to the log data LOG is the difference data. In other words, the data acquired in Step S210 except for a part which can be complemented by the log data LOG stored in the past is newly stored in the storage device 120.

On the other hand, when the remaining capacity is equal to or larger than the predetermined amount (Step S230; No), the processing proceeds to Step S250. In Step S250, the processor 110 stores all data acquired in Step S210 in the storage device 120.

Data stored in the storage device 120 in Step S240 or Step S250 is the control data. After the control data is stored in the storage device 120, the processing ends.

4. Effect

Effects of these processes is described. As described above, the control data is stored in preparation for a case where it becomes necessary to verify how the autonomous driving control is performed later or the like. Therefore, it is desirable that as much data as possible is stored among the control data acquired while the autonomous driving control is being performed at least until verification or the like is completed and it is determined that the control data does not need to be stored.

However, since the capacity of the storage device 120 has a limitation, a volume of the control data which can be stored in the storage device 120 also has a limitation. If the remaining capacity of the storage device 120 decreases and becomes insufficient for a required capacity, the control data cannot be newly stored in the storage device 120. Therefore, when the remaining capacity of the storage device 120 decreases and it is suggested that the capacity may become insufficient, it is necessary to preserve the remaining capacity.

According to the autonomous driving system 100 of the present embodiment, when the remaining capacity of the storage device 120 becomes equal to or less than the predetermined amount, a travel route having increased common points with the past travel of the vehicle 1 by the autonomous driving control is generated. When the vehicle 1 travels along the travel route generated in this way, a part of the control data which can be complemented by the log data LOG stored in the past becomes large. Thus, even in a case where it is difficult to store the control data, it is possible to ensure transparency and ease of verification of the autonomous driving control.

In addition, according to the present embodiment, the control data stored in the storage device 120 is the difference data.

The difference data is data obtained by excluding a portion overlapping with the log data LOG stored in the past from the data related to the autonomous driving control. Since the overlapping portion can be complemented by the past data, if at least the difference data is stored, a situation can be explained by combining the data acquired in the past and the difference data acquired this time. That is, the difference data is, in other words, minimum data to be stored considering use for verification later. By making data to be stored minimum data needed and omitting storing data which can be explained by the combination with the past data when the remaining capacity is reduced, volume of the control data to be newly stored can be reduced.

Further, selecting a candidate route having more common points with the travel record DAT as the travel route is effective in reducing the volume of the difference data. When the vehicle 1 travels along the travel route having more common points, it is expected that information which is equivalent to information included in the log data LOG stored in the past increases among information input to the autonomous driving control unit during traveling and information output from the autonomous driving control unit. That is, the volume of the difference data can be reduced, and the remaining capacity of the storage device 120 can be effectively preserved. As described above, according to the autonomous driving system 100 of the present embodiment, it is possible to effectively prevent a situation in which the remaining capacity of the storage device 120 become insufficient while securing information necessary for explanation and verification.

5. Modification 5-1. First Modification

Figure 5:
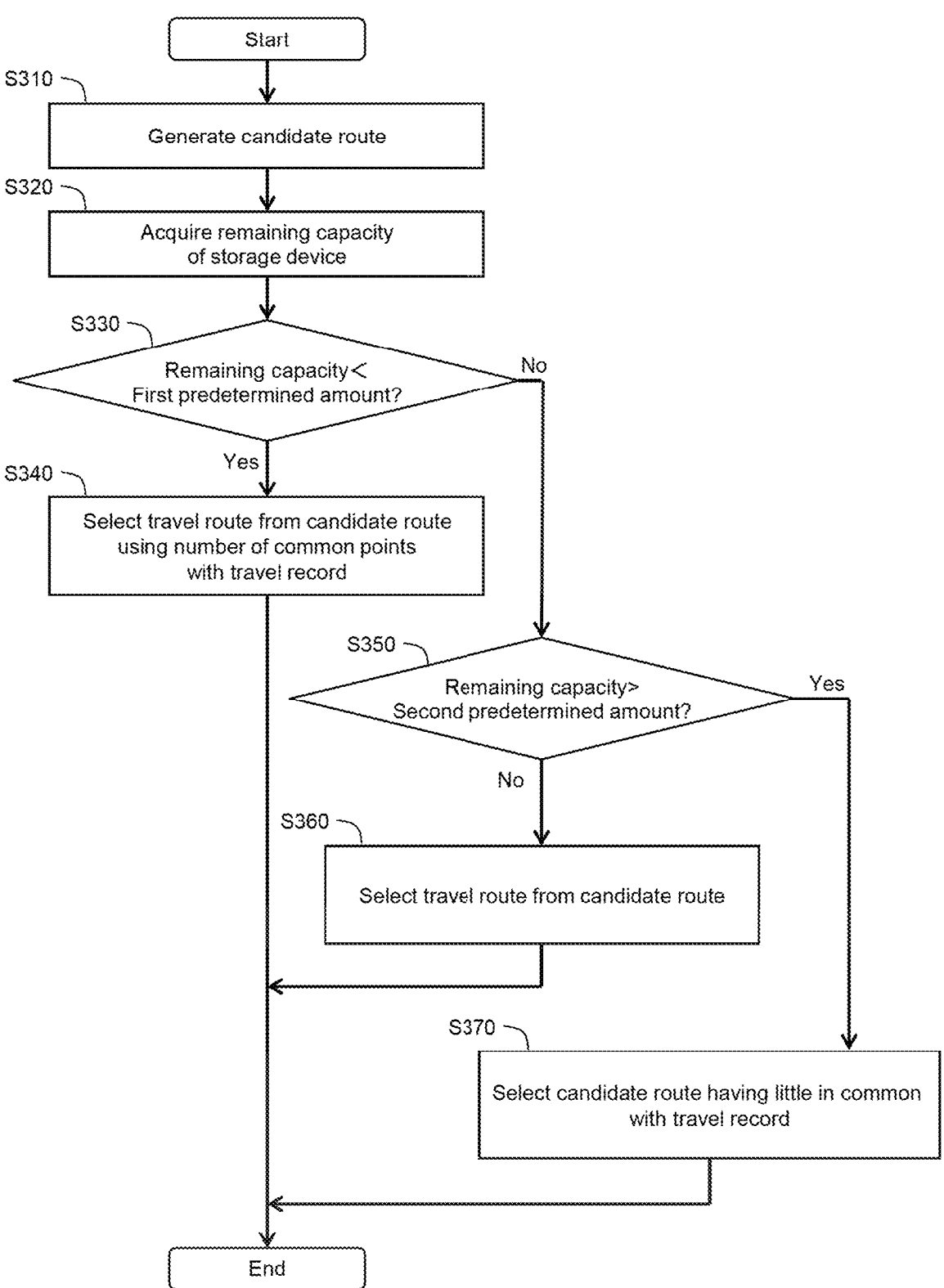
FIG. 5 is a flowchart showing an example of processing related to generation of the travel route in a first modification.

FIG. 5 is a flowchart showing an example of processing related to generation of the travel route in the first modification. The timing at which the processing is executed is the same as that in the flowchart of FIG. 3.

Processes from Step S310 to Step S340 are the same as the processes from Step S110 to Step S140 in FIG. 3. However, in Step S330, if the remaining capacity of the storage device 120 is equal to or larger than a first predetermined amount (Step S330; No), the processing proceeds to Step S350. The first predetermined amount is the same as the predetermined amount in Step S130 of FIG. 3.

In Step S350, the processor 110 determines whether the remaining capacity of the storage device 120 is larger than a second predetermined amount or not. The second predetermined amount may be larger than or equal to the first predetermined amount. If the remaining capacity of the storage device 120 is equal to or less than the second predetermined amount (Step S350; No), the processing proceeds to Step S360. If the remaining capacity of the storage device 120 is larger than the second predetermined amount (Step S350; Yes), the processing proceeds to Step S370.

A process of Step S360 is the same as the process of Step S160 in FIG. 3. On the other hand, in Step S370, the processor 110 selects the travel route from one ore more candidate routes using smallness of the number of the common points with the travel record DAT as an index. Specifically, the processor 110 selects a candidate route having few common points with the travel record DAT as the travel route. After the travel route is selected in Step S370, the processing ends.

The control data acquired during the autonomous driving and stored in the storage device 120 can be used as the log data LOG when the vehicle 1 travels later. Further, the data can be used as learning data of a machine learning model for subsequent autonomous driving control. Therefore, in this modification, when the remaining capacity of the storage device 120 is larger than the predetermined amount, the travel route is selected in which it is expected that many pieces of control data which are differences from data acquired in the past can be acquired. In other words, when the remaining capacity of the storage device 120 is sufficient, the autonomous driving system 100 selects the travel route in which more data which has not been experienced in the past can be newly collected.

The index for determining the smallness of the common points is basically the reverse of the index for determining the largeness of the common points used in Step S140 of the flowchart of FIG. 3. That is, in Step S370, the candidate route having few common points with the travel record DAT is selected based on smallness of the common route with the past-record route, smallness of the common lane with the past-record lane, smallness of the common road shape with the past-record road shape, or the like.

For example, the processor 110 may select a candidate route which includes a route including many road shapes not included in the travel record DAT. Alternatively, the processor 110 may select the candidate route in which the vehicle 1 travels in a different lane in the same road (for example, a candidate route in which the vehicle 1 travels in a right lane in a case where the travel record DAT includes data of traveling in a left lane).

Alternatively, from a viewpoint of utilization as a new travel record or learning data, a criterion for determining the smallness of common points with the travel record DAT may further include a criterion from a viewpoint of a time zone or a frequency. For example, the travel route including many portions of route which have been traveled few times in the past may be determined to have few common points. Alternatively, even if the travel route includes the same route as the past-record route, it may be determined that it has few common points in a case where the vehicle 1 travels in a time zone in which the vehicle has not traveled in the past. Thus, the candidate route which include more elements that the vehicle 1 has not experienced in the past is determined to have fewer common points.

5-2. Second Modification

The second modification is described. In a second modification, the vehicle 1 is connected to an external management server via a communication network. In this case, a part of the processor 110 and the storage device 120 may be included in the management server, and at least a part of the processing shown in the flowchart of FIG. 3 may be executed in the management server. In this case the departure place, the destination, and the remaining capacity of the storage device 120 are transmitted from the vehicle 1 to the management server at the timing of determining the travel route, for example. Then, the processor of the management server executes the processing shown in the flowchart of FIG. 3 based on the received information and information held by the management server and determines the travel route. Then, the determined travel route is transmitted to the vehicle 1. Alternatively, the candidate route may be generated in the management server, and the traveling route may be selected in the vehicle. In this case, the departure place and the destination are transmitted to the management server, and the management server generates the candidate route based on these pieces of information and information held by the management server and transmits one or more generated candidate routes to the vehicle 1.

The management server may be a server which manages a plurality of vehicles 1. In this case, the travel record DAT may be aggregated data of data obtained from a plurality of vehicles 1. In this case, similarly, a part of the processor 110 and the storage device 120 may be included in the management server. That is, the management server may be a processing entity that generates the candidate route and selects the travel route. A part or all of the travel record DAT may be stored in a storage device of the management server, and the management server may distribute the stored data to the vehicle 1.

In a case where the travel record DAT is data obtained from a plurality of vehicles 1, the common point in the candidate route with the travel record DAT does not necessarily equal to something common with the past-record route, the past-record lane, or the past-record road shape which the target vehicle 1 itself has experienced in the past. That is, the candidate route having much in common with a route along which a vehicle 1 different from the target vehicle 1 has traveled in the past may be selected as the travel route. Since the data acquired from the plurality of vehicles 1 is aggregated, the travel record DAT can be collected more efficiently, and thus the difference data can be further reduced.

The first modification and the second modification may be combined. In a case where processing described in the first modification is executed as the processing related to the generation of the travel route and the plurality of vehicles 1 are managed by the management server, the following example is also possible. If there is insufficient data in the travel record DAT aggregated by the management server, the management server demands the user of the vehicle 1 to travel along a route in which the target data can be collected. For example, it is assumed that data of the vehicle 1 traveling in a certain route is not included in the travel record DAT. In this case, if the remaining capacity of the storage device 120 is sufficient, it is desirable that a candidate route including the certain route is selected as the travel route. However, in this case, there is a possibility that the time required for the travel becomes long. In such a case, the management server gives an incentive such as a point return to the user when a candidate route having few points in common with the travel record DAT is selected, and promotes that the travel route which can collect a large amount of new data is selected while maintaining the user's satisfaction.

What is claimed is:

1. A travel route management system that generates a travel route for autonomous driving control of a vehicle, the travel route management system comprising:

one or more storage devices configured to store a travel record that includes data of past travel of the vehicle by the autonomous driving control; and processing circuitry mounted on the vehicle, wherein the vehicle comprises a target storage device that stores log data related to the autonomous driving control, and the processing circuitry is configured to execute:

acquiring a remaining capacity of the target storage device;

generating a plurality of candidate routes;

selecting the travel route from the plurality of candidate routes;

selecting the travel route includes using a number of common points with the travel record as an index for selecting the travel route from the plurality of candidate routes when the remaining capacity is smaller than a predetermined amount;

storing difference data by excluding a portion overlapping the log data in response to the remaining capacity being smaller than the predetermined amount; and performing the autonomous driving control of the vehicle in accordance with the selected travel route.

2. The travel route management system according to claim 1, wherein selecting the travel route includes using smallness of the number of the common points with the travel record as an index for selecting the travel route from the plurality of candidate routes when the remaining capacity is larger than the predetermined amount.

3. The travel route management system according to claim 1, wherein the travel record includes data related to a past-record route along which the vehicle travels in a past, and the processing circuitry is further configured to determine that a candidate route from the plurality of candidate routes having more in common with the past-record route is larger in the number of common points.

4. The travel route management system according to claim 3, wherein the travel record further includes data related to a past-record lane in which the vehicle travels in a past, the plurality of candidate routes includes information specifying a lane in which the vehicle travels, and the processing circuitry is further configured to determine that the candidate route from the plurality of candidate routes having more in common with the past-record lane is larger in the number of common points.

5. The travel route management system according to claim 1, wherein the travel record includes information about a past-record road shape existing in a route along which the vehicle travels in a past, and the processing circuitry is further configured to execute:

acquiring information about a road shape included in each of the plurality of candidate routes; and determining that a candidate route from the plurality of candidate routes having more in common with the past-record road shape routes is larger in the number of common points.

* * * * *